US012472824B2

(12) United States Patent
Nagasawa et al.

(10) Patent No.: US 12,472,824 B2
(45) Date of Patent: Nov. 18, 2025

(54) DISPLAY DEVICE FOR VEHICLES AND DISPLAY METHOD FOR VEHICLES

(71) Applicant: Nissan Motor Co., Ltd., Kanagawa (JP)

(72) Inventors: Natsuko Nagasawa, Kanagawa (JP); Yasutomo Sasanuma, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 175 days.

(21) Appl. No.: 18/574,246

(22) PCT Filed: Jun. 28, 2021

(86) PCT No.: PCT/JP2021/024353
§ 371 (c)(1),
(2) Date: Dec. 26, 2023

(87) PCT Pub. No.: WO2023/275931
PCT Pub. Date: Jan. 5, 2023

(65) Prior Publication Data
US 2024/0239197 A1   Jul. 18, 2024

(51) Int. Cl.
*B60K 35/22* (2024.01)
*B60K 35/81* (2024.01)
(52) U.S. Cl.
CPC .............. *B60K 35/81* (2024.01); *B60K 35/22* (2024.01); *B60K 2360/1438* (2024.01)
(58) Field of Classification Search
None
See application file for complete search history.

(56) References Cited

U.S. PATENT DOCUMENTS

| 10,071,631 B1 * | 9/2018 | Aizawa ................. B60K 35/22 |
| 2005/0001714 A1 | 1/2005 | Amari |

(Continued)

FOREIGN PATENT DOCUMENTS

| JP | 2005-022590 A | 1/2005 |
| JP | 2008-195393 A | 8/2008 |

(Continued)

*Primary Examiner* — James M Mcpherson
(74) *Attorney, Agent, or Firm* — Osha Bergman Watanabe & Burton LLP

(57) ABSTRACT

A display device for vehicles includes a display unit installed in front of a driver seat of a vehicle and having a first area and a second area. The first area displays first information used for travel control of the vehicle. The second area is provided at a position farther from the driver seat than the first area and displaying second information other than the first information. The display device further includes a control unit performing, in response to a user's operation, at least one of enlarging a display portion of information displayed on the display unit or adding new information to the display unit; and a determination unit determining, when the display portion of the first information displayed in the first area is enlarged or when new first information is added to the first area, whether or not a size of the enlarged display portion of the first information or a size of the display portion of the new first information to be added is larger than the first area. When the determination unit determines that the size of the enlarged display portion of the first information or the size of the display portion of the new first information to be added is larger than the first area, the control unit reduces the second area, enlarges the first area, and displays the first information whose display portion is enlarged or the new first information in the enlarged first area. When the display portion of the second information displayed in the second area is enlarged or when new second information is added to the second area, the determination unit determines whether or not a size of the enlarged display portion of the second information or a size (Continued)

of the display portion of the new second information to be added is larger than the second area. When the determination unit determines that the size of the enlarged display portion of the second information or the size of the display portion of the new second information to be added is larger than the second area, the control unit maintains the size of the second area and adjusts the size of the enlarged display portion of the second information or the size of the display portion of the new second information to be added to match the size of the second area.

11 Claims, 9 Drawing Sheets

(56) References Cited

U.S. PATENT DOCUMENTS

| | | | |
|---|---|---|---|
| 2008/0150709 | A1 | 6/2008 | Yamamoto et al. |
| 2008/0197990 | A1 | 8/2008 | Yamamoto et al. |
| 2008/0204205 | A1 | 8/2008 | Yamamoto et al. |
| 2008/0252439 | A1 | 10/2008 | Yamamoto et al. |
| 2010/0265053 | A1 | 10/2010 | Yamamoto et al. |
| 2019/0308501 | A1 | 10/2019 | Saka et al. |
| 2020/0105230 | A1 | 4/2020 | Jung |
| 2020/0210131 | A1 | 7/2020 | Gomes Chang et al. |
| 2021/0375236 | A1* | 12/2021 | Edgren .................. G06N 20/00 |
| 2022/0386483 | A1* | 12/2022 | Zhang .................. H05K 5/0017 |

FOREIGN PATENT DOCUMENTS

| | | |
|---|---|---|
| JP | 2015080994 A | 4/2015 |
| JP | 2017-185847 A | 10/2017 |
| JP | 2019-182150 A | 10/2019 |
| JP | 2020/106992 A | 7/2020 |
| JP | 2020-160180 A | 10/2020 |

* cited by examiner

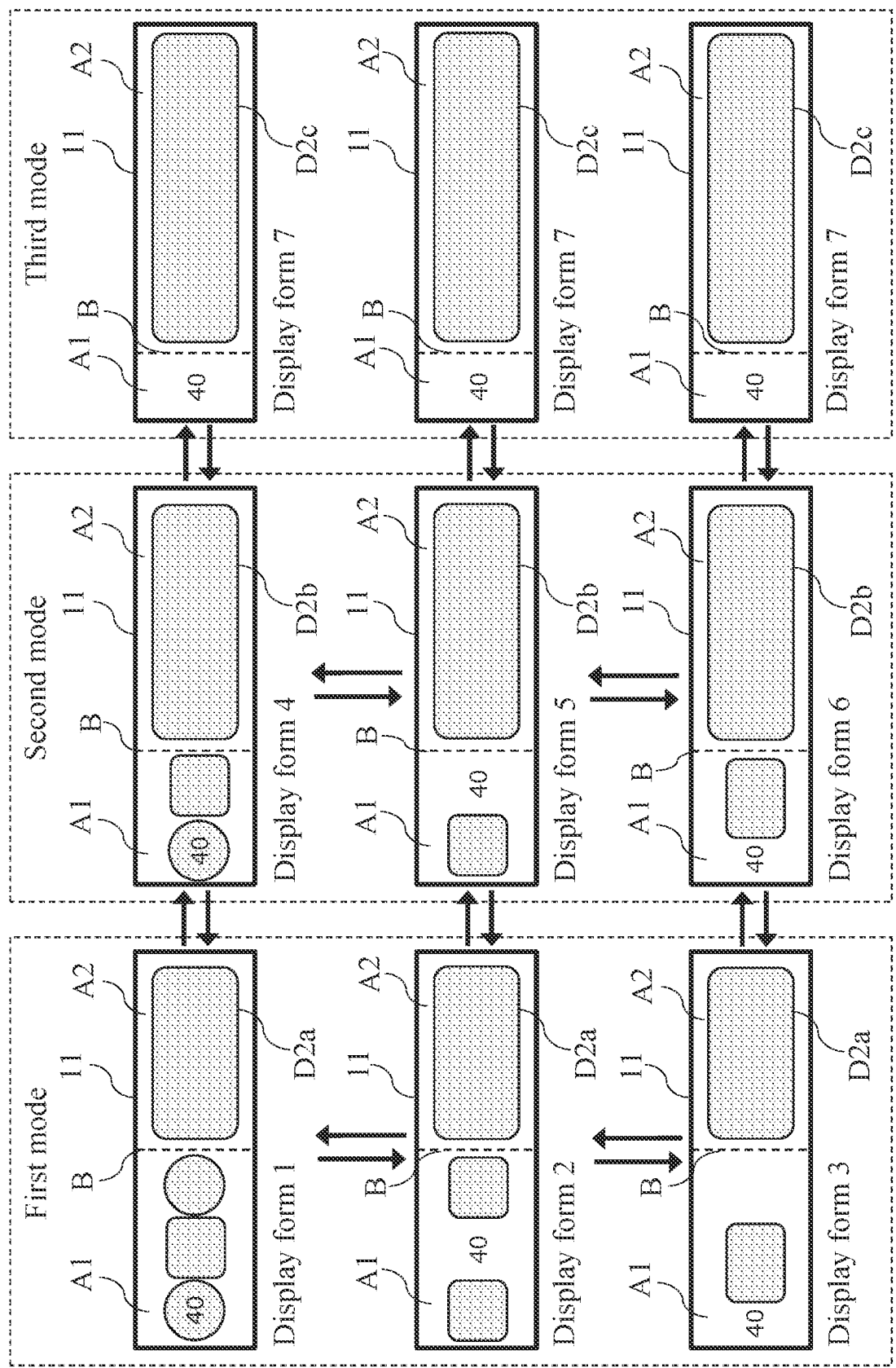

FIG. 7A
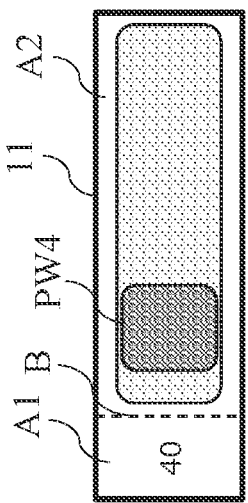
Display form 4
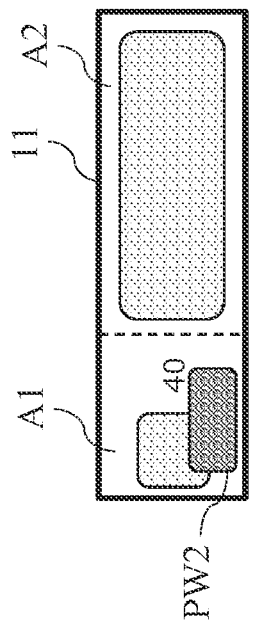
Display form 5
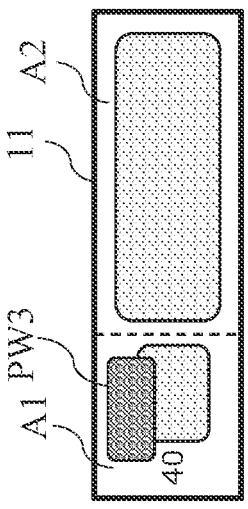
Display form 6
FIG. 7B
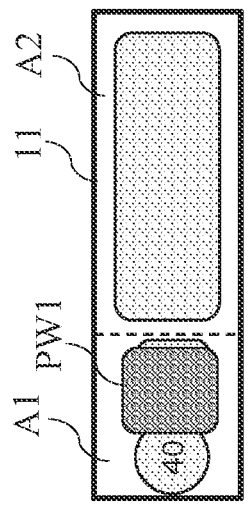
Display form 7

DISPLAY DEVICE FOR VEHICLES AND DISPLAY METHOD FOR VEHICLES

TECHNICAL FIELD

The present invention relates to a display device for vehicles and a display method for vehicles both for displaying information in a vehicle.

BACKGROUND ART

A method of displaying a specific screen on a first display unit on the driver seat side or on a second display unit on the front passenger seat side is known (Patent Document 1). The specific screen displays information regarding functions of programs and is represented by a menu screen displaying icons of application programs. In this method, when information related to the application programs is input in a state in which the specific screen is not displayed on either the first display unit or the second display unit, the specific screen is displayed on a predetermined display unit.

PRIOR ART DOCUMENT

Patent Document

Patent Document 1: JP2020-106992A

SUMMARY OF INVENTION

Problems to be Solved by Invention

In the above prior art, if an application program has a telephone call function and the specific screen is displayed to notify an incoming call, for example, the specific screen to notify the incoming call may be displayed on the first display unit on the driver seat side while the vehicle is traveling. If the display on the driver seat side display unit is thus switched while the vehicle is traveling, there is a risk that the information necessary for the driver to control the travel of the vehicle will not be displayed in a sufficient size.

A problem to be solved by the present invention is to provide a display device for vehicles and a display method for vehicles with which even when the display is changed, the information necessary for travel control is displayed to the driver in a sufficient size.

Means for Solving Problems

The present invention solves the above problem through, when enlarging a display portion of first information displayed in a first area displaying the first information used for travel control of a vehicle or when adding new first information to the first area, determining whether or not a size of the enlarged display portion or a size of the display portion of the new first information to be added is larger than the first area, and when determining that the size of the enlarged display portion or the size of the display portion of the new first information to be added is larger than the first area, reducing a second area displaying second information other than the first information, enlarging the first area, and displaying the first information whose display portion is enlarged or the new first information in the enlarged first area.

Effect of Invention

According to the present invention, even when the display on the display unit is changed, the information necessary for travel control is displayed to the driver in a sufficient size.

BRIEF DESCRIPTION OF DRAWINGS

FIG. 6 is a transition diagram illustrating an example of display changes by the control unit of FIG. 1.

FIG. 7A is a set of front views illustrating an example of pop-up windows displayed when the display form is changed from a second mode to a third mode in FIG. 6.

FIG. 7B is a front view illustrating an example of a pop-up window displayed when the display form is changed from the third mode to the second mode in FIG. 6.

MODE(S) FOR CARRYING OUT THE INVENTION

Hereinafter, one or more embodiments of the display device for vehicles and display method for vehicles according to the present invention will be described with reference to the drawings. It is assumed that the vehicle described below has the driver seat and steering wheel installed on the left side of the vehicle. For a vehicle having the driver seat and steering wheel installed on the right side of the vehicle, the following description shall be read so as to be symmetrical between right and left.

[Display Device for Vehicles]

Figure 1:
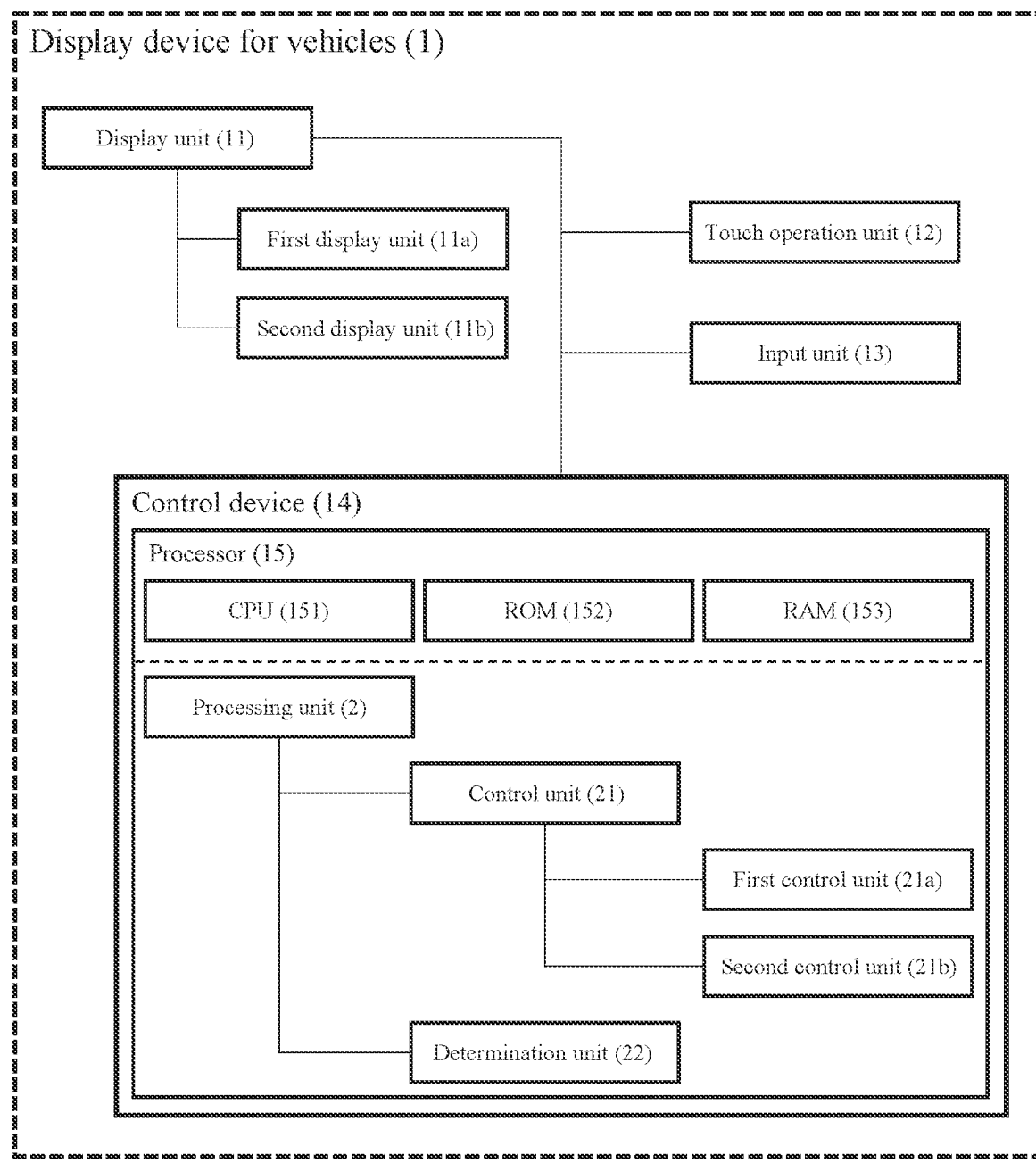
FIG. 1 is a block diagram illustrating one of embodiments of a display device for vehicles according to the present invention.

FIG. 1 is a block diagram illustrating a display device for vehicles 1 according to the present invention. Previously, information items indicating the traveling state of a vehicle, such as the vehicle speed, engine rotation speed, water temperature, and autonomous travel control state, have been displayed on the instruments built in an instrument panel in front of the driver seat, while information items that do not relate to the traveling state of the vehicle, such as the map information of a navigation device, information on the temperature setting for an air conditioner, and information on a music player, have been displayed on a display installed, for example, on the instrument panel between the driver seat and the front passenger seat. In the display device for vehicles 1 according to the present invention, when the same display is used to display the information which has been displayed on the instrument panel in front of the driver seat and the information which has been displayed elsewhere, information necessary for the driver to control the travel of the vehicle can be displayed to the driver in a sufficient size by ensuring an area for displaying the necessary information.

As illustrated in FIG. 1, the display device for vehicles 1 includes a display unit 11, a touch operation unit 12, an input unit 13, and a control device 14. The devices constituting the display device for vehicles 1 are connected to each other so as to be able to mutually exchange data by known means such as a wired or wireless LAN, represented by CAN (Controller Area Network). The control device 14 does not need to be provided together with the display unit 11, the touch operation unit 12, and the input unit 13 and may be provided in a server at a remote location away from the vehicle.

The display unit 11 is a display device for providing information to users and may be, for example, a liquid crystal display, a projector such as a head-up display (HUD), or the like. Users include, in addition to the driver, occupants in the front passenger seat and rear seat and occupants who are located away from the vehicle and are virtually on board using an avatar (alter ego). In the present embodiment, the display unit 11 is installed in front of the driver seat of the vehicle, and its length in the vehicle width direction is, for example 30% to 50% of the total width of a typical vehicle. When the total width of a typical vehicle is about 1.5 m, the length of the display unit 11 is 45 to 75 cm, which corresponds to about 20 to 35 inches when converted to the display size. This can balance the user operability and the size of the display unit 11. The display unit 11 may be a single display unit as a hardware device, but as illustrated in FIG. 1, for example, the display unit 11 may include two display units as hardware devices of a first display unit 11a and a second display unit 11b that is different from the first display unit 11a and is installed closer to the front passenger seat than the first display unit 11a in the vehicle width direction. The display unit 11 may be composed of three or more display units as hardware devices or may include a speaker in addition to a screen that displays information.

Figure 2A:
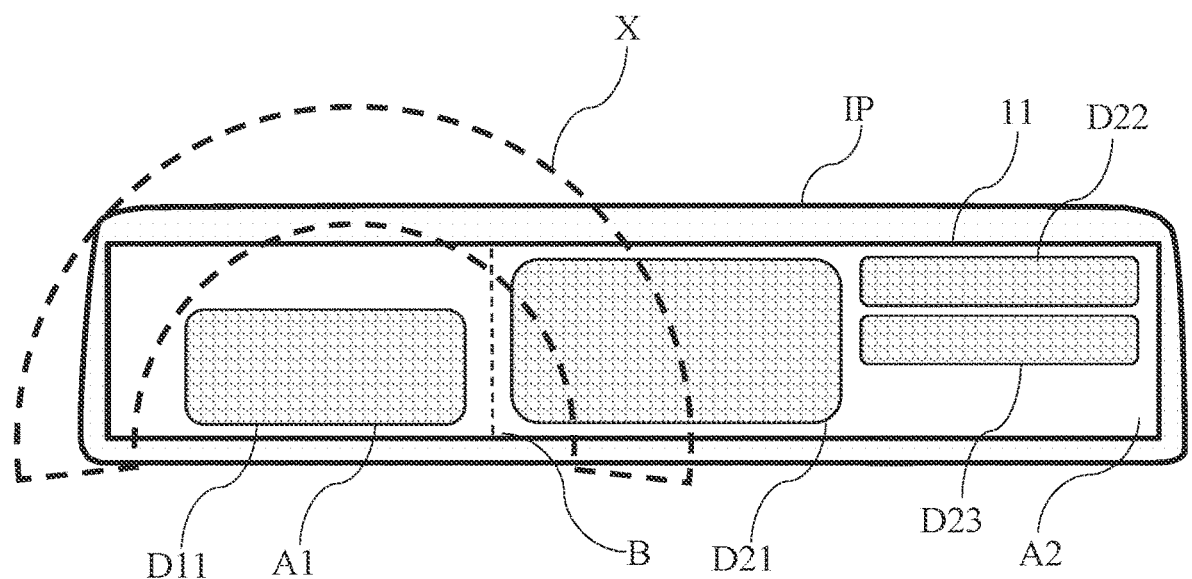
FIG. 2A is a front view illustrating an example of a display unit of FIG. 1.

FIG. 2A is a plan view illustrating an example of the display unit 11. In FIG. 2A, the display unit 11 is installed in an instrument panel IP of the vehicle and has a first area A1 and a second area A2. The first area A1 displays information used for travel control of the vehicle (also referred to as "first information." hereinafter), and the second area A2 displays information other than the first information that is not used for travel control of the vehicle (also referred to as "second information." hereinafter). The first area A1 and the second area A2 are separated by a boundary B indicated as a dashed line near the center of the display unit 11, and the sizes of the first area A1 and second area A2 can be changed by the user's operation and an instruction from the control device 14. The information used for travel control of the vehicle is information that is mainly used by the driver, and the first area A1 is therefore provided on the driver seat side of the display unit 11. That is, the first area A1 is provided at a position closer to the driver seat than the second area A2, and the second area A2 is provided at a position farther from the driver seat of the vehicle than the first area A1.

In the first area A1 of FIG. 2A, the information used for travel control of the vehicle is displayed in a hatched portion D11. The information used for travel control of the vehicle refers, for example, to information used for control of the vehicle, such as speed control, steering control, and stability control of the vehicle. Information indicating a traveling state of the vehicle includes information obtained from various sensors of the vehicle. Stability control of the vehicle refers, for example, to control to control the roll angle and yaw angle of the vehicle to suppress sideslip of the vehicle. Examples of the information displayed in the first area A1 include the traveling speed and acceleration of the vehicle, the engine rotation speed, the temperatures of the cooling water and engine oil, the operating state of the parking brake, the position of the transmission gear, the operating state of the direction indicator, the lighting state of headlights, the operating state of wipers, and the angular velocity of the vehicle. The information indicating the traveling state of the vehicle includes information indicating the state of autonomous travel assistance for the vehicle in addition to the information acquired from the sensors. Examples of such information include information indicating that only assistance for either autonomous speed control or autonomous steering control is being performed, information indicating that speed control and steering control are being autonomously controlled, information indicating that lane change assistance is being executed, and information indicating that the vehicle is following a preceding vehicle with autonomous travel assistance.

On the other hand, in the second area A2 of FIG. 2A, information that is not used for travel control of the vehicle is displayed in hatched portions D21, D22, and D23. The information that is not used for travel control of the vehicle refers, for example, to information that is not used for control of the vehicle, such as speed control, steering control, or stability control of the vehicle, and information that does not indicate the traveling state of the vehicle. Examples of such information include map information of a navigation device, operation information of in-vehicle AV equipment such as a radio, music player, and DVD player, information on applications such as games, and image information serving as the background of the display unit 11. Particularly in the display unit 11 of the present embodiment, the second information is displayed on the second display unit 11b which is different from the first display unit 11a and is installed farther from the driver seat than the first display unit 11a in the vehicle width direction. In the second area A2 of FIG. 2A, information is displayed separately in three portions of D21. D22, and D23, but the form of information display in the second area A2 is not particularly limited, and the information may also be displayed separately in two or more portions for respective information items or displayed collectively as one portion. In another embodiment, there may be a portion in which no information is displayed in the second area A2.

Area X illustrated in FIG. 2A is an area that combines an area in which the steering wheel exists when viewed from the driver and an area through which the driver's hands operating the steering wheel pass when viewed from the driver. The area X will also be referred to as a steering wheel operation area, hereinafter. The display unit 11 of the present embodiment does not display information on a portion of the first area A1 that is included in the steering wheel operation area X, that is, a portion that overlaps with the steering wheel or a hand of the driver when viewed from the driver. This is because information displayed behind the steering wheel or hand cannot be seen from the driver, so if information used for travel control of the vehicle is displayed in an area that overlaps with the steering wheel operation area, the driver cannot perceive the traveling state of the vehicle and cannot concentrate on driving. In the case of FIG. 2A, the information used for travel control of the vehicle is displayed in the portion D1 of the first area A1, but the outer edge of D11 is not included in the area X when viewed from the driver. On the other hand, the information displayed in the second area A2 may be included in the steering wheel operation area X when viewed from the driver, like the display portion D21 of FIG. 2A. This is because even if the driver cannot visually recognize information that is not used for travel control of the vehicle, there is no problem in the driving operations.

Figure 2B:
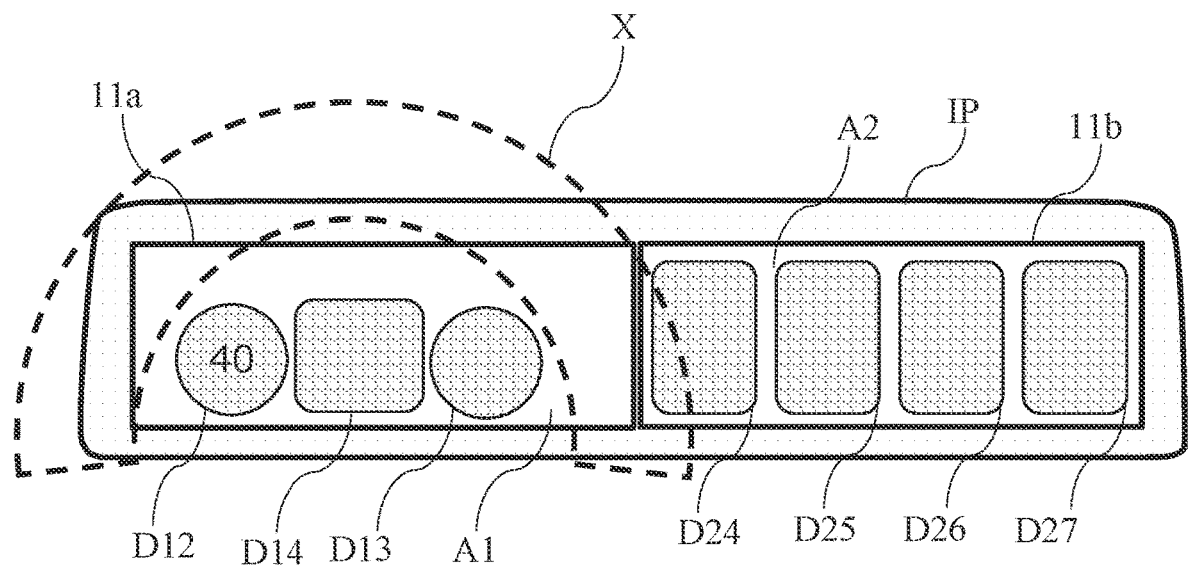
FIG. 2B is a front view illustrating an example of a first display unit and a second display unit of FIG. 1.

FIG. 2B is a plan view illustrating another example of the display unit 11. The display unit of FIG. 2B is composed of the first display unit 11a and the second display unit 11b, both of which are installed in the instrument panel IP of the vehicle. The first display unit 11a and the second display unit 11b are different display units, and the second display unit 11b is installed closer to the front passenger seat than the first display unit 11a in the vehicle width direction. In FIG. 2B, the first display unit 11a is set in the first area A1, and the second display unit 11b is set in the second area A2. Therefore, information used for travel control of the vehicle is displayed on the first display unit 11a, and information that is not used for travel control of the vehicle is displayed on the second display unit 11b. The information displayed can be controlled by using the first display unit 11a and the second display unit 11b as one display area, and the first area A1 or the second area A2 may be set across the two display units 11a and 11b.

In the first area A1 of FIG. 2B, unlike the first area A1 of FIG. 2A, information used for travel control of the vehicle is displayed separately in three hatched portions D12. D13, and D14. The display portion D12 displays, for example, the vehicle speed or "40" of FIG. 2B because the vehicle is traveling at 40 km/h. The display portion D13 displays, for example, the engine rotation speed in the unit of rpm. The display portion D14 displays, for example, icons indicating the operating state of the parking brake, the position of the gear, the operating state of the direction indicator, the lighting state of the headlights, the operating state of the wipers, the state of autonomous travel assistance, etc.

As in the case of FIG. 2A, outer edges of the display portions D12. D13, and D14 are not included in a portion of the first area A1 of FIG. 2B that is included in the steering wheel operation area X. In the first area A1 of FIG. 2B, information is displayed separately in three portions of D12. D13, and D14, but the form of information display in the first area A1 is not particularly limited, and the information may also be displayed separately in two or more portions for respective information items or displayed collectively as one portion as in the first area A1 of FIG. 2A. In another embodiment, there may be a portion in which no information is displayed in the second area A2.

On the other hand, in the second area A2 of FIG. 2B, unlike the second area A2 of FIG. 2A, information that is not used for travel control of the vehicle is displayed separately in four hatched portions D24. D25. D26, and D27. Like the display portion D21 of FIG. 2A, the outer edge of the display portion D24 of FIG. 2B is displayed at a position included in the steering wheel operation area X when viewed from the driver because there is no problem in the driving operation even if the driver cannot visually recognize the display portion D24. It is not necessary that the first area A1 should correspond to the first display unit 11a or the second area A2 should correspond to the second display unit 11b, and a part of the first display unit 11a may be set in the first area A1, and a portion of the first display unit 11a that is not included in the first area A1 and the second display unit 11b may be set in the second area A2.

Referring again to FIG. 1, the touch operation unit 12 is a device for receiving instructions input by a user's finger touch or a stylus pen and operating the display device for vehicles 1 according to the received instructions. The touch operation unit 12 may be provided as a touch panel together with the display unit 11. Input to the touch operation unit 12 is detected, for example, from the movement of a user's finger or stylus pen that contacts the touch operation unit 12. For example, when the user touches the outer edge of the information display portion with one finger and moves the touched outer edge while keeping the finger in contact with the touch operation unit 12, the touch operation unit 12 detects an input that enlarges the display portion in the direction in which the outer edge is moved. Additionally or alternatively, when the user touches the display portion with two fingers and moves the two fingers in parallel as they are, the touch operation unit 12 detects an input that moves the display portion in parallel along the direction of movement of the fingers. Additionally or alternatively, when the user touches the display portion with three fingers and moves the three fingers in parallel as they are, the touch operation unit 12 detects an input that moves the display portion in parallel along the direction of movement of the fingers and moves the display portion off the screen. The movements of the user's finger and stylus pen are not limited to these, and inputs corresponding to almost all other movements are preliminarily set.

The touch operation unit 12 of the present embodiment accepts an input to change the display in the second area A2, but does not accept an input to change the display in the first area A1. This is because if the driver can operate the display unit 11 by touching a portion that overlaps with the steering wheel operation area X, there is a risk that the driver will not be able to concentrate on the operation of the steering wheel. That is also because if a user other than the driver can instruct changes to the display in the first area A1, there is a risk that the display of information used for travel control may be changed against the driver's intention and the driver will not be able to concentrate on the driving.

Figure 3A:
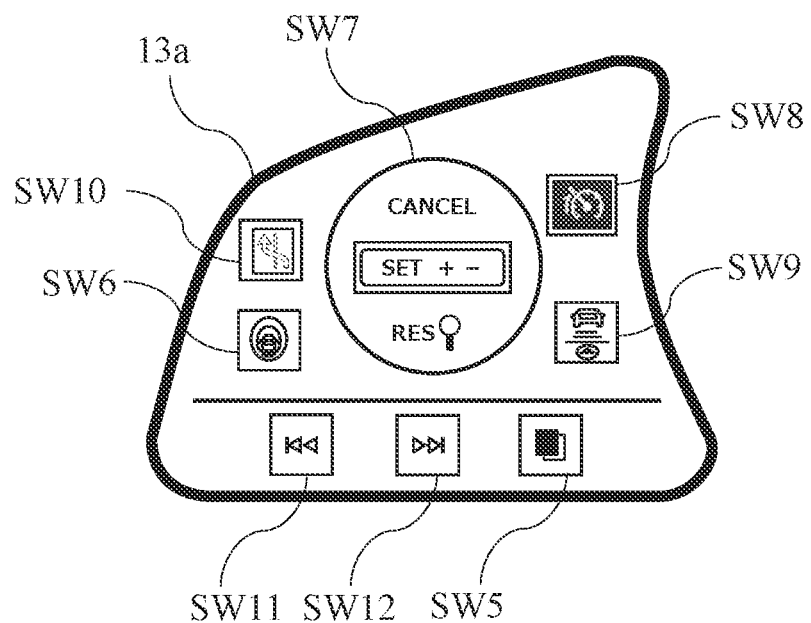
FIG. 3A is a front view illustrating an example of an input unit of FIG. 1 (part 1).
Figure 3B:
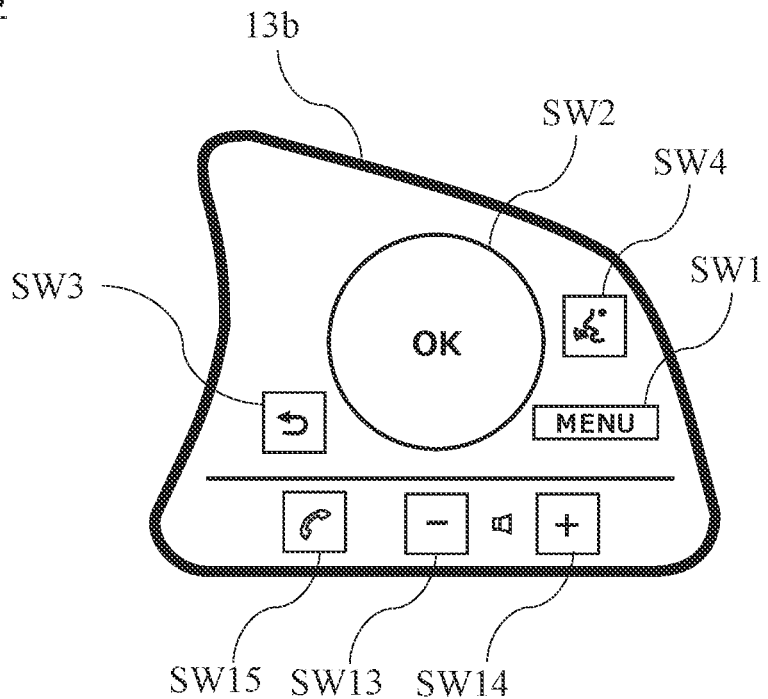
FIG. 3B is a front view illustrating an example of an input unit of FIG. 1 (part 2).

The input unit 13 is a device for inputting operations to the display unit 11. The input unit 13 is provided, for example, at such a position on the steering wheel that the driver can operate it with his/her fingers while holding the steering wheel, and the number of input units 13 is not particularly FIGS. 3A and 3B are front views illustrating examples of input units provided on the steering limited, wheel. In a state in which the steering wheel is not rotated (i.e., the steering angle is 0°), an input unit 13a illustrated in FIG. 3A is provided on the left side of the steering wheel, and an input unit 13b illustrated in FIG. 3B is provided on the right side of the steering wheel. The input units 13a and 13b are provided at appropriate positions within a range that does not interfere with the driver's operation of the steering wheel. The input units 13a and 13b are provided with switches SW1 to SW15 for inputting instructions to change the display on the display unit 11. The driver can press the switch SW1 of the input unit 13b to display a menu screen on the display unit 11. Operations on the menu screen (inputs of up/down and right/left) and inputs of determination are performed with the switch SW2, and when returning to the previous screen, the switch SW3 is pressed. The switch SW4 is a switch that activates a voice input function using voice recognition. Thus, the input from the input unit 13 can also be performed by voice.

Display of the information used for travel control such as speed control, steering control, and stability control of the vehicle can be switched by pressing the switch SW5 of the input unit 13a. The autonomous travel assistance function is activated by pressing the switch SW6 of the input unit 13a, and the switch SW7 is used to adjust the set vehicle speed, inter-vehicle distance, etc. Specifically, by pressing the switch SW8, the set vehicle speed during the constant speed travel control can be changed, and by pressing the switch SW9, the inter-vehicle distance during follow-up travel can be changed. The lane change assist function can be activated by pressing the switch SW10. The switches SW11 and SW12 of the input unit 13a are those for changing the track being played when the music player is activated, and the switches SW13 and SW14 of the input unit 13b are those for changing the volume of the music being played. The switch SW15 is a switch for activating a telephone conversation function, and input with this switch is allowed only when predetermined conditions based on the laws and regulations of each country are satisfied.

In the present embodiment, only the driver can input operations to the input unit 13, and a determination is therefore made that the driver's consent is obtained. For example, an operation of displaying on the entire display unit 11 an image of the surroundings of the vehicle acquired by an imaging device results in a limited display of information used for travel control of the vehicle, so it is also possible to accept only inputs from the input unit 13.

Referring again to FIG. 1, the control device 14 is a device for providing necessary information to a user in response to the user's operations or the like in the vehicle. The user's operations are input from the touch operation unit 12 and the input unit 13. The control device 14 uses a processor 15 to achieve the functions of processing necessary data according to the input operations and providing the necessary information to the user. The processor 15 includes a ROM (Read Only Memory) 152 that stores programs, a CPU (Central Processing Unit) 151 that is an operating circuit for serving as the control device 14 by executing the programs stored in the ROM 152, and a RAM (Random Access Memory) 153 that serves as an accessible storage device.

[Processing Unit]

The programs used in the control device 14 of the present embodiment include a processing unit 2 that is a functional block for achieving the function of providing necessary information to the user in the control device 14. For the operations input from the touch operation unit 12 and the input unit 13, the processing unit 2 has a function of making a determination regarding changes of the display as necessary so that an area for displaying information necessary for the driver to control travel of the vehicle is ensured, and also has a function of requesting consent from the driver. As illustrated in FIG. 1, the processing unit 2 includes a control unit 21 and a determination unit 22, and the control unit 21 is provided with a first control unit 21a and a second control unit 21b. For descriptive purposes, these units are extracted and illustrated in FIG. 1.

Figure 4:
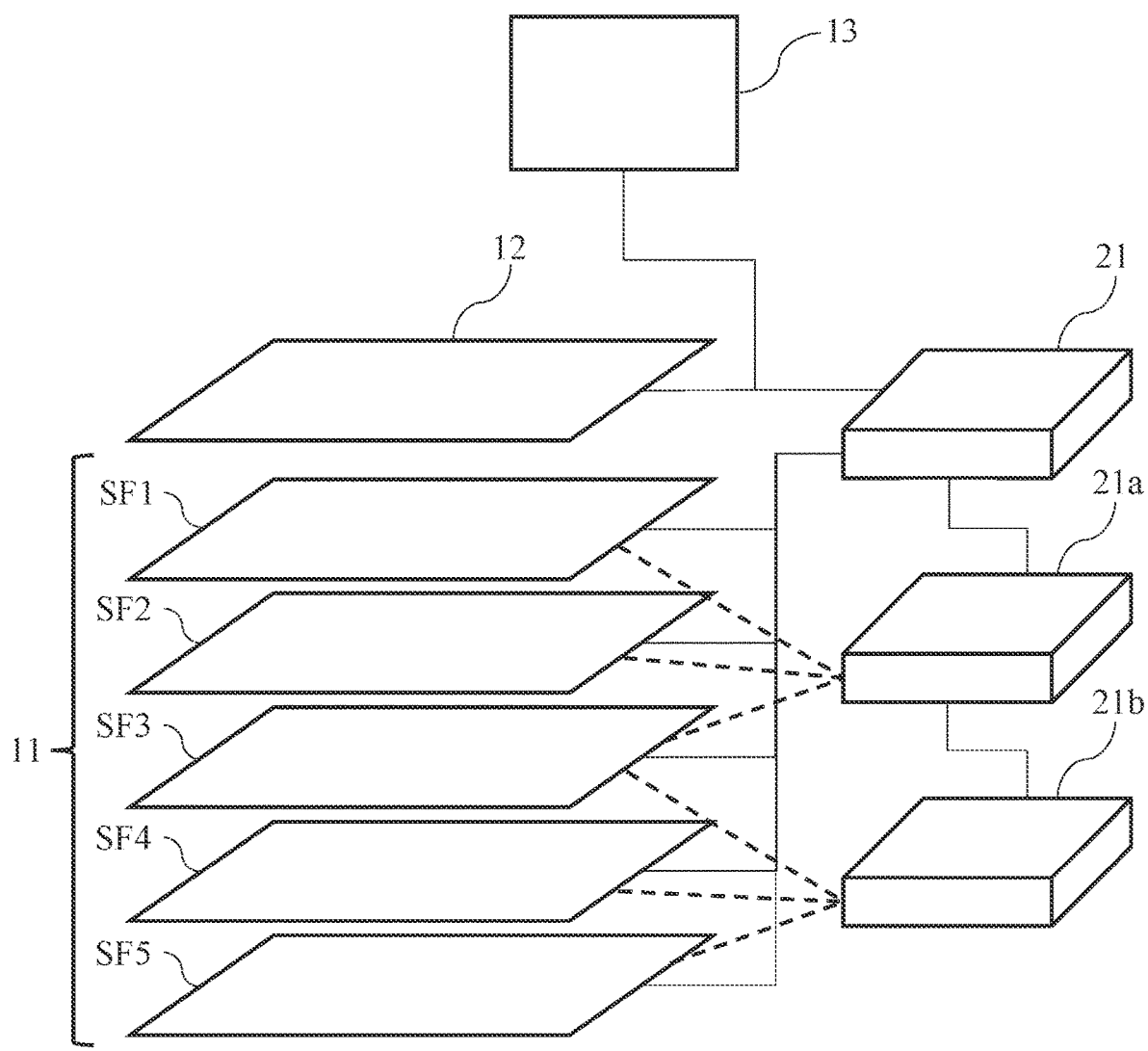
FIG. 4 is a block diagram illustrating the relationship among the display unit, touch operation unit, input unit, control unit, first control unit, and second control unit of FIG. 1.

The block diagram illustrated in FIG. 4 will be used to describe an example of the relationship among the display unit 11, touch operation unit 12, input unit 13, control unit 21, first control unit 21a, and second control unit 21b in the display device for vehicles 1 of the present embodiment. In FIG. 4, the display unit 11 is controlled by the control unit 21, and operations of changing the display on the display unit 11 are input to the control unit 21 from the touch operation unit 12 and the input unit 13. The first control unit 21a is connected to the control unit 21, the second control unit 21b is connected to the first control unit 21a, and the three control units are thus connected in series. The output of the second control unit 21b is therefore input to the control unit 21 via the first control unit 21a. In another embodiment, the second control unit 21b may be connected to the control unit 21, and the first control unit 21a may be connected to the second control unit 21b.

The display unit 11 of FIG. 4 is a liquid crystal display, and the touch operation unit 12 is provided on the display surface. The control unit 21 controls the display on the display unit 11 using five virtual display surfaces SF1 to SF5. Specifically, the control unit 21 generates images to be displayed on respective display surfaces SF1 to SF5, rasterizes and superimposes the generated images on the display surfaces, and displays one superimposed image on the display unit 11. The order of superimposing the display surfaces is fixed such that the display surface SF1 is the highest surface while the display surface SF5 is the lowest surface, and the images are superimposed in the order of the display surface SF5-display surface SF4-display surface SF3→display surface SF2→display surface SF1. In other words, the image generated as a display on the display surface SF4 is superimposed on the image generated as a display on the display surface SF5, the image generated as a display on the display surface SF3 is superimposed thereon, the image generated as a display on the display surface SF2 is further superimposed thereon, and the image generated as a display on the display surface SF1 is finally superimposed thereon. Therefore, the image generated to be displayed on the display surface SF1 is always displayed in a state that is visible to the user, but some or all of the other display surfaces SF2 to SF5 are in a state that is invisible to the user due to the images generated to be displayed on the higher display surface or surfaces. When nothing is displayed on a higher display surface, the image generated to be displayed on the lower display surface is displayed to the user in a state in which the entire image is visible. For example, when nothing is displayed on the display surface SF1, the entire image generated to be displayed on the display surface SF2 is displayed on the display unit 11. Thus, the control unit 21 changes the image to be displayed on each of the display surfaces SF1 to SF5 thereby to control the image after superimposing the display surfaces SF1 to SF5, and can output the image to the display unit 11 in response to the user's operation.

Information displayed on each of the display surfaces SF1 to SF5 is preliminarily determined. For example, the display surface SF1 displays information or the like, such as the vehicle speed and predetermined warning light, for example, that is stipulated by laws or regulations so as to be always displayed in a state of being visible to the driver. The display surface SF2 displays information used for travel control and directly related to the driver's operation of the vehicle, such as the engine rotation speed, gear position, and autonomous travel assistance state. In addition, a pop-up window to be described later is also information displayed on the display surface SF2. The display surface SF3 displays information regarding the navigation device, operation information for the music player, etc., the display surface SF4 displays information on applications such as games, and the display surface SF5 displays background image data. Thus, the importance of displayed information in the travel control decreases as the display progresses from the higher display surface to the lower display surface. As described above, the control unit 21 changes the display on the display unit 11 through changing the images displayed on the display surfaces SF1 to SF5, superimposing the images, and controlling the superimposed image and can control the information provided to the user.

The content of the information displayed on each of the display surfaces SF1 to SF5 is controlled, for example, by the first control unit 21a and second control unit 21b illustrated in FIG. 4. The information displayed on the display surfaces SF1 and SF2 and a part of the display surface SF3 is controlled by the output of the first control unit 21a, and the information displayed on the remaining part of the display surface SF3 and the display surfaces SF4 and SF5 is controlled by the output of the second control unit 21b. The correspondence relationships between the control units and the display surfaces are illustrated with dashed lines of FIG. 4. In FIG. 4, the control unit 21, the first control unit 21a, and the second control unit 21b are connected in series, but this is because the information whose display is controlled by the first control unit 21a has a higher importance level than that of the information whose display is controlled by the second control unit 21b. In other words, by setting the first control unit 21a as a master and the second control unit 21b as a slave, priority can be given to control regarding the display of highly important information.

Here, the control device 14 illustrated in FIG. 1 includes all of the above functional blocks, but it is not necessary for a single control device 14 to include all of the functional blocks, and one or some of the above functional blocks may be provided in another equipment included in the display device for vehicles 1 or may also be provided in another information processing device (not illustrated). It is also not necessary for a single device to execute all of the processes in the functional blocks, and the functions of functional blocks may be achieved across a plurality of devices that are connected in a state in which data can be exchanged. For example, in the display device for vehicles 1 of FIG. 1, among the processes executed by the control unit 21, one or some of the processes may be executed by the touch operation unit 12, and the remaining processes may be executed by the control device 14. In this case, part of the processing for achieving the functions of the control unit 21 will be performed using the CPU. ROM, and RAM of the touch operation unit 12.

The functions performed by each functional block of the processing unit 2 illustrated in FIG. 1 will be described below.

The control unit 21 has a function of controlling the display on the display unit 11, and in particular controls the information displayed in the first area A1 and second area of the display unit 11 and the sizes of the first area A1 and second area A2. The determination unit 22 has a function of executing a determination necessary for the control unit 21 to change the display on the display unit 11. The following description will be made for each of processes executed in the control unit 21 regarding the processing performed to exhibit the functions of the control unit 21 and the roles played by the determination unit 22 in the processing.

The control unit 21 has a function of changing the display of information displayed on the display unit 11 in response to the user's operation. The control unit 21 executes a display change that performs at least one of moving, rotating, enlarging, or reducing the display portion in which information is displayed. Particularly in the present embodiment, the control unit 21 has a function of performing, in response to the user's operation, at least one of enlarging the display portion of information displayed on the display unit 11 or adding new information to the display unit 11. The movement is not particularly limited, and the control unit 21 may move two or more display portions in parallel. Additionally or alternatively, the control unit 21 may simultaneously move, rotate, enlarge, or reduce two or more display portions. The enlargement ratio and reduction ratio may be continuous or discrete.

The input of display change is detected, for example, from the movement of a user's finger that contacts the touch operation unit 12. For example, when the user touches the left outer edge of the display portion D21 of FIG. 2A with a finger and moves the touched outer edge to the left while keeping the finger in contact with the touch operation unit 12, a determination is made that the user inputs an input to enlarge the display portion D21 to the left, and the input of that display change is detected. When the user touches the display portion D23 of FIG. 2A with two fingers and moves the two fingers downward in parallel, a determination is made that the user inputs an input to move the display portion D23 downward, and the input of that display change is detected. As another example, when the driver presses the switch SW5 of the input unit 13a of FIG. 3A, the control unit 21 accepts an input to execute display changes for the display portion D11 of FIG. 2A and the display portions D12 to D14 of FIG. 2B.

The display form of the first information in the first area A1 is not particularly limited, but it is preferred that the display form of the first information be preliminarily set because the first information is relatively important information used for the travel control. The driver uses the input unit 13 to select an arbitrary display form from among a plurality of display forms that are preliminarily set. Then, when an operation to enlarge the display portion of the first information displayed in the first area A1, such as an operation to change a display portion D1a of the first information illustrated in FIG. 5A to the display portions D12 to D14 illustrated in FIG. 5B, is input via the input unit 13 or when an operation to add new first information to the first area A1 is input via the input unit 13, the determination unit 22 determines whether or not the size of the enlarged display portion of the first information or the size of the display portion of the new first information to be added is larger than the first area A1. This determination will be described with reference to FIGS. 5A and 5B.

Figure 5A:
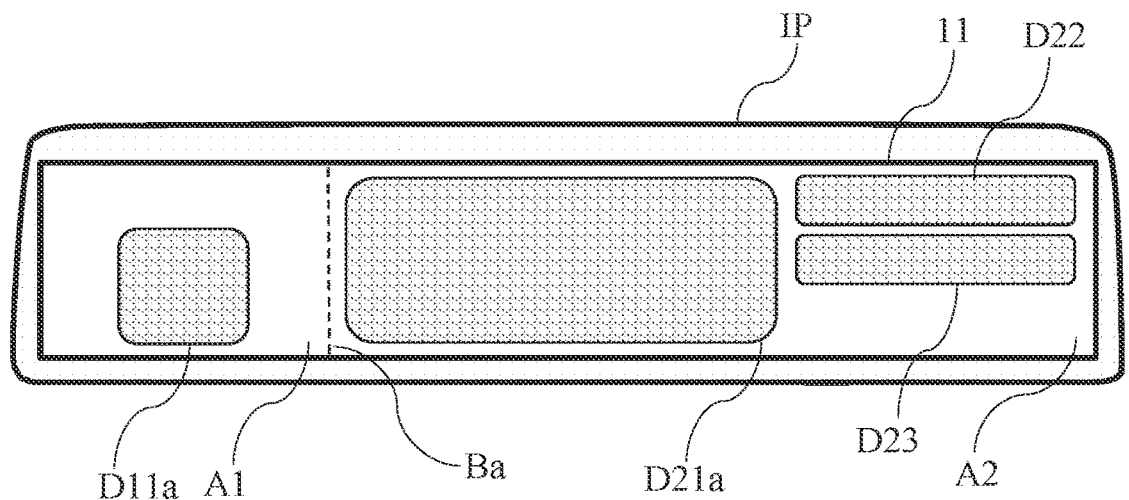
FIG. 5A is a front view illustrating an example of the case of enlarging a first area on a display unit 11 of FIG. 1 (part 1).
Figure 5B:
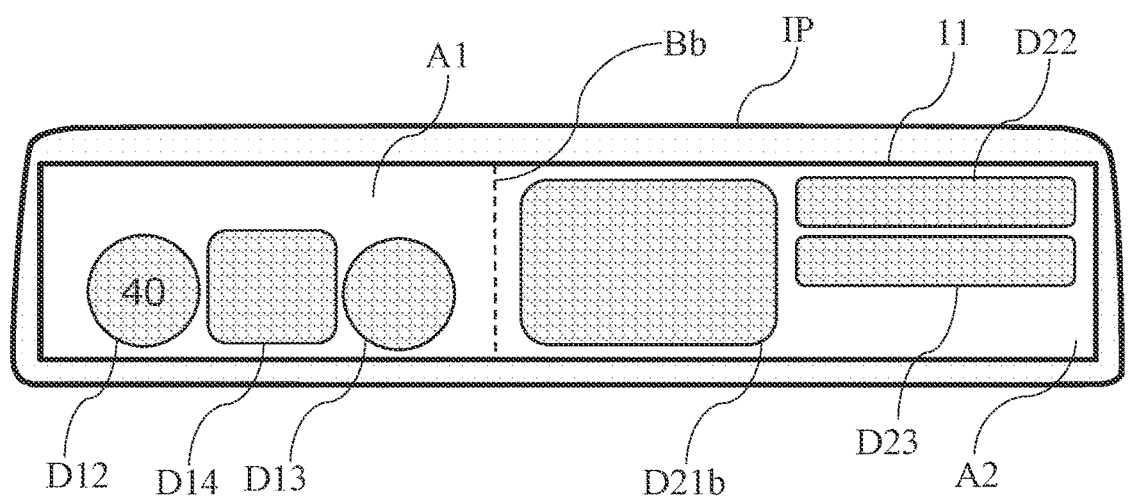
FIG. 5B is a front view illustrating an example of the case of enlarging the first area on the display unit 11 of FIG. 1 (part 2).

When the driver inputs an operation from the input unit 13 to change the display portion D11a of FIG. 5A to the display portions D12 to D14 of FIG. 5B, the determination unit 22 compares the size of the display portions D12 to D14 of the new first information to be added with the size of the first area A1 of FIG. 5A. The first area A1 of FIG. 5A is smaller than the display portions D12 to D14 of the new first information to be added, and the display portions D12 to D14 cannot be displayed as they are in the first area A1. The determination unit 22 therefore determines that the size of the display portions D12 to D14 of the new first information to be added is larger than the current first area A1.

As another example, when the driver inputs an operation from the input unit 13 to change the display portion D11a of FIG. 5A to the display portion D11 of FIG. 2A, the determination unit 22 compares the size of the enlarged display portion D11 of the first information with the size of the first area A1 of FIG. 5A. The first area A1 of FIG. 5A is smaller than the enlarged display portion D11 of the first information, and the display portion D11 cannot be displayed as it is in the first area A1. The determination unit 22 therefore determines that the size of the enlarged display portion D11 of the first information is larger than the current first area A1.

Then, when the determination unit 22 determines that the size of the enlarged display portion of the first information or the size of the display portion of the new first information to be added is larger than the first area A1, the control unit 21 reduces the second area A2, enlarges the first area A1, and displays the first information whose display portion is enlarged or the new first information in the enlarged first area A1. For example, when the display portion D11a of FIG. 5A is changed to the display portions D12 to D14 of FIG. 5B, boundary Ba of FIG. 5A, which is the boundary between the first area A1 and the second area A2, is moved to the position of a boundary Ba of FIG. 5. Accordingly, in the second area A2, display portion D21a of the second information is reduced to D21b. Additionally or alternatively, when the driver inputs an operation from the input unit 13 to change the display portion D11a of FIG. 5A to the display portion D11 of FIG. 2A, the boundary Ba of FIG. 5A is moved to the position of the boundary B of FIG. 2A. Accordingly, in the second area A2, the display portion D21a of the second information is reduced to D21.

On the other hand, when enlarging the display portion of the second information displayed in the second area A2, such as when an operation of change to enlarge the display in the second area A2 is input via the touch operation unit 12, or when adding new second information to the second area A2, the determination unit 22 determines whether or not the size of the enlarged display portion of the second information or the size of the display portion of the new second information to be added is larger than the second area A2. For example, when the user touches the left outer edge of the display portion D21 illustrated in FIG. 2A with one finger and moves it toward the left side of FIG. 2A to enlarge D21 of FIG. 2A to D21a of FIG. 5A, the determination unit 22 compares the size of the second area A2 of FIG. 2A with the size of the display portions D21a. D22, and D23 of FIG. 5A. The second area A2 of FIG. 2A is smaller than the enlarged display portion D21a and the display portions D22 and D23, and the display portions D21a. D22, and D23 cannot be displayed as they are in the second area A2. The determination unit 22 therefore determines that the size of the display portions D21a. D22, and D23 is larger than the current second area A2.

As another example, when an operation of adding the display portion of new second information to the left of the display portion D21b of FIG. 5B is input from the touch operation unit 12, the determination unit 22 compares the size of the second area A2 of FIG. 5B with the size of the display portions D21b. D22, and D23 of FIG. 5A and the display portion added to the left of D21b. In the second area A2 of FIG. 5B, there is no area to display new information on the left side of the display portion D21b, so the new second information cannot be displayed as it is in the second area A2. The determination unit 22 therefore determines that the size of the display portions D21b. D22, and D23 of FIG. 5B and the display portion added to the left of D21b is larger than the current second area A2.

Then, when the determination unit 22 determines that the size of the enlarged display portion of the second information or the size of the display portion of the new second information to be added is larger than the second area A2, the control unit 21 maintains the size of the second area A2 and adjusts the size of the display portion of the second information to match the size of the second area A2. For example, when an attempt is made to enlarge the display portion D21 of FIG. 2A to the display portion D21a of FIG. 5A, the size of the second area A2 is maintained in the state of FIG. 2A, and the display portion D21 is not enlarged.

Additionally or alternatively, when an attempt is made to add the display portion of new second information to the left of the display portion D21b of FIG. 5B, the size of the second area A2 is maintained in the state of FIG. 5B, and the display portion of new second information is not added.

However, when the user inputs an operation to reduce the first area A1, the control unit 21 may reduce the first area A1 or enlarge the second area A2 in response to the operation. At that time, the control unit 21 reduces the first area A1 after obtaining the consent of the driver of the vehicle. For example, upon attempting to enlarge the display portion D21 of FIG. 2A to the display portion D21a of FIG. 5A, when the driver of the vehicle agrees to increase the size of the second area A2 and reduce the size of the first area A1 to the state of FIG. 5A, the control unit 21 enlarges the display portion D21 of FIG. 2A to D21a of FIG. 5A. Additionally or alternatively, upon attempting to add the display portion of new second information to the left of the display portion D21b of FIG. 5B, when the driver agrees to reduce the size of the first area A1 of FIG. 5B, the display portion of new second information is added to the left of the display portion D21b, the first area A1 is reduced, and the second area A2 is enlarged.

After obtaining the consent of the driver of the vehicle, when requesting the driver's consent to execute the display change upon reduction of the first area A1, the control unit 21 may display a pop-up window on the display unit 11 and use the pop-up window to request consent to reduce the first area A1. The pop-up window in the present embodiment refers to a display portion that is displayed on the display unit 11 in which information for requesting consent from the driver is displayed, and is displayed so as to overlap with the display portion of other information. For example, buttons for inputting whether to consent or refuse are provided in the pop-up window, and the user can press either button with a finger to input a response to the request for consent via the touch operation unit 12. The control unit 21 can display the pop-up window on the driver seat side in the vehicle width direction so that the driver can input a response to the request for consent from the touch operation unit 12. In this case, in order to display the pop-up window on the driver seat side, the display of the pop-up window may be controlled by the first control unit 21a that controls the display in the first area A1 near the driver seat.

When responding to a request for consent to the display change by accepting or refusing the request, the response may be input from equipment such as the input unit 13 that can only be operated by the driver. For example, a response to the consent requested in the pop-up window may be input from the switch SW2 or SW3 of the input unit 13b of FIG. 3B. That is, the driver presses the switch SW2 to accept execution of the display change or presses the switch SW3 to refuse execution of the display change. Alternatively or in addition to this, the input may be made from equipment such as the touch operation unit 12 that can be operated by a user other than the driver. In other words, it is the driver who determines whether to accept or refuse execution of the display change, but it is not limited to the driver who inputs the driver's determination to the control unit 21, and it may be a user other than the driver who has confirmed the driver's response to the display change of the display unit 11. The control unit 21 obtains consent to execute the display change from equipment that can only be operated by the driver or equipment that can be operated by users other than the driver.

When the user inputs an instruction to change the display on the display unit 11, the control unit 21 may notify the user of the influence caused by changing the display on the display unit 11. For example, when enlarging the display portion D21 illustrated in FIG. 2A toward the left in FIG. 2A in response to the user's input from the touch operation unit 12, the control unit 21 notifies the driver that the first area A1 will be reduced. The notification may be, for example, displayed on the display unit 11 in a pop-up window to notify the user that the first area A1 will be reduced, or may also be notified to the user as a sound from a speaker provided in the display unit 11. As another example, when the user touches the left outer edge of the display portion D24 illustrated in FIG. 2B and moves the touched outer edge to the right to reduce the display portion D24, the control unit 21 notifies the driver that part of the information displayed in the display portion D24 will be hidden in accordance with the display change of reducing the display portion D24. The notification may be, for example, displayed in the second area A2 of the display unit 11 or may also be notified to the user as a sound from a speaker provided in the display unit 11.

When a display change is executed on the display portion of the information displayed on the display unit 11, the determination unit 22 determines whether or not the outer edge of the display portion overlaps with the steering wheel or the driver's hand when viewed from the driver. Specifically, the determination unit 22 determines whether or not the steering wheel operation area X is present between the position of the display portion of information and a position of the driver's viewpoint (e.g., the position of an eye) that is preliminarily set. For example, when the user crases the display portion D21 illustrated in FIG. 2A through touching it with three fingers and moving them in parallel and moves the display portion D22 to the position of the display portion D21 through touching it with two fingers and moving them in parallel, the determination unit 22 determines whether or not the steering wheel operation area X is present between the outer edge of the display portion D22 and the position of the driver's viewpoint that is preliminarily set. In this case, since the area X is present between the outer edge of the moved display portion D22 and the driver's viewpoint, the determination unit 22 determines that the outer edge of the display portion overlaps with the steering wheel when viewed from the driver. Then, when the determination unit 22 determines that the outer edge of the display portion overlaps with the steering wheel or a hand when viewed from the driver, the control unit 21 requests the driver's consent to execute the display change.

[Examples of Display Changes on Display Unit]

Display changes by the control unit 21 of the present embodiment will now be described using examples illustrated in FIG. 6. FIG. 6 is an explanatory diagram illustrating an example of display changes executed by the control unit 21. FIG. 6 illustrates a plurality of display forms of the display unit 11, and the display on the display unit 11 transitions from a certain display form to a different display form by the control unit 21 executing the display change in response the user's operations which are input from the touch operation unit 12 and the input unit 13. In the example illustrated in FIG. 6, there are three modes of a first mode, a second mode, and a third mode as the display forms of the display unit 11, and the mode transitions from the first mode to the second mode and transitions from the second mode to the third mode in response to the user's operation. Likewise, the mode transitions from the third mode to the second mode and transitions from the second mode to the first mode in response to the user's operation. The case of transitioning from the first mode to the second mode and transitioning from the second mode to the third mode will first be described.

In the first mode, the sizes of the first area A1 and second area A2 separated by the boundary B are almost the same, and there are display forms 1, 2, and 3 as specific display forms. The display form 1, display form 2, and display form 3 differ in the display of information in the first area A1, but the display in the second area A2 is the same. In the display form 1, three display portions of information are present in the first area A1, and the left display portion displays the traveling speed. The middle display portion displays warning lights, etc., and the right display portion displays, for example, the engine rotation speed. In the display form 2, the traveling speed is displayed in the center, and warning lights, gear position state, etc. are displayed on both sides. In the display form 3, the traveling speed is displayed on the left side, and icons, etc. that display the state of autonomous travel assistance are displayed on the right side. The driver can switch the display in the first area A1 to any of the display form 1, display form 2, or display form 3 by inputting an operation to change the display from the input unit 13.

It is assumed that when the display on the display unit 11 is in the first mode, an operation is input from the touch operation unit 12, for example, to enlarge a display portion A2a in the second area A2 to the left. In this case, the control unit 21 allows the mode to transition to the second mode in response to the user's operation without requesting the driver's consent to execute the display change. This is because although the right side portion of the first area A1 is replaced with the second area A2, the display of information in the first area A1 does not change and does not correspond to the display change against the driver's intention.

In the example illustrated in FIG. 6, the display form when transitioning from the first mode to the second mode is preliminarily set for each display form. As illustrated in FIG. 6, the display form transitions from the display form 1 to a display form 4, transitions from the display form 2 to a display form 5, and transitions from the display form 3 to a display form 6. In the second mode, the sizes of the first area A1 and second area A2 separated by the boundary B change from those in the first mode, and the second area A2 is larger than the first area A1. In the second mode, the size of the second area A2 is approximately twice the size of the first area A1. In the second mode, there are the display form 4, display form 5, and display form 6 as specific display forms. The display form 4, display form 5, and display form 6 differ in the display of information in the first area A1, but the display in the second area A2 is the same. In the display form 4, there are two display forms of information in the first area A1, and the display portion on the right side of the first area A1 in the display form 1 is replaced with the second area A2. Likewise, in the display form 5, the display portion on the right side of the display form 2 is replaced with the second area A2. In the display form 6, the portion in which nothing is displayed in the first area A1 is replaced with the second area A2. The driver can switch the display in the first area A1 to any of the display form 4, display form 5, or display form 6 by inputting an operation to change the display from input unit 13.

It is assumed that when the display on the display unit 11 is in the second mode, an operation is input from the touch operation unit 12, for example, to enlarge a display portion A2b in the second area A2 to the left. In this case, the determination unit 22 determines whether or not at least a part of the first area A1 is replaced with the second area A2 when a display portion D2b of information displayed in the second area A2 is enlarged. In the example of FIG. 6, if the display portion D2b is enlarged to the left, a part of the first area A1 will be replaced with the second area A2. Unlike the case of transitioning from the first mode to the second mode, the display of information in the first area A1 changes. The control unit 21 therefore requests the driver's consent to execute the display change on the display unit 11. When requesting the consent, the control unit 21 displays a pop-up window in the first area A1 of the display unit 11.

FIG. 7A is a set of front views illustrating examples of pop-up windows displayed when transitioning from the second mode to the third mode. When the display on the display unit 11 is in the display form 4, a pop-up window PW1 is displayed, for example, on the right side of the first area A1. When the display on the display unit 11 is in the display form 5, a pop-up window PW2 is displayed, for example, at the bottom center of the first area A1. When the display on the display unit 11 is in the display form 6, a pop-up window PW3 is displayed, for example, at the top center of the first area A1. None of the pop-up windows is displayed overlapping the display portion of the traveling speed. When the driver's consent to the display change is obtained using these pop-up windows, the control unit 21 uses its function to allow the display on the display unit 11 to transition from the second mode to the third mode. On the other hand, when the driver's consent to the display change is not obtained, the display on the display unit 11 remains in the second mode.

In the example illustrated in FIG. 6, the display form when transitioning from the second mode to the third mode is preliminarily set. As illustrated in FIG. 6, the display form in the third mode is only the display form 7, and the display form transitions to the display form 7 from any of the display form 4, the display form 5, and the display form 6. In the third mode, the sizes of the first area A1 and the second area A2 separated by the boundary B change from those in the second mode, and the size of the second area A2 is the largest within a range that is preliminarily set. In the display form 7, only the traveling speed of the vehicle is displayed in the first area A1, and in the second area A2, information that is not used for travel control of the vehicle is displayed in a display portion indicated by D2c.

The case of transitioning from the third mode to the second mode and transitioning from the second mode to the first mode will then be described.

It is assumed that when the display on the display unit 11 is in the third mode, an operation is input from the touch operation unit 12, for example, to reduce a display portion A2c in the second area A2. In this case, the display portion of information displayed in the first area A1 is changed, and the control unit 21 therefore requests the driver's consent to execute the display change on the display unit 11 in order to prevent the display change from being against the driver's intention. When requesting the consent, the control unit 21 displays a pop-up window PW4 as illustrated in FIG. 7B in the second area A2 of the display unit 11. When the driver's consent to the display change is obtained, the control unit 21 uses its function to allow the display on the display unit 11 to transition from the third mode to the second mode. Specifically, the display form transitions to any one of the display mode 4, display mode 5, and display mode 6 which have been displayed before transitioning to the third mode. On the other hand, when the driver's consent to the display change is not obtained, the display on the display unit 11 remains in the third mode.

Referring again to FIG. 6, it is assumed that when the display on the display unit 11 is in the second mode, an operation is input from the touch operation unit 12, for example, to reduce the display portion A2b in the second area A2. In this case, the control unit 21 allows the mode of the display form to transition to the first mode in response to the user's operation without requesting the driver's consent. This is because the display of information in the first area A1 does not change and does not correspond to the display change against the driver's intention. Specifically, the display form transitions to any one of the display mode 1, display mode 2, and display mode 3 which have been displayed before transitioning to the second mode.

[Processing in Display Device for Vehicles]

Figure 8A:
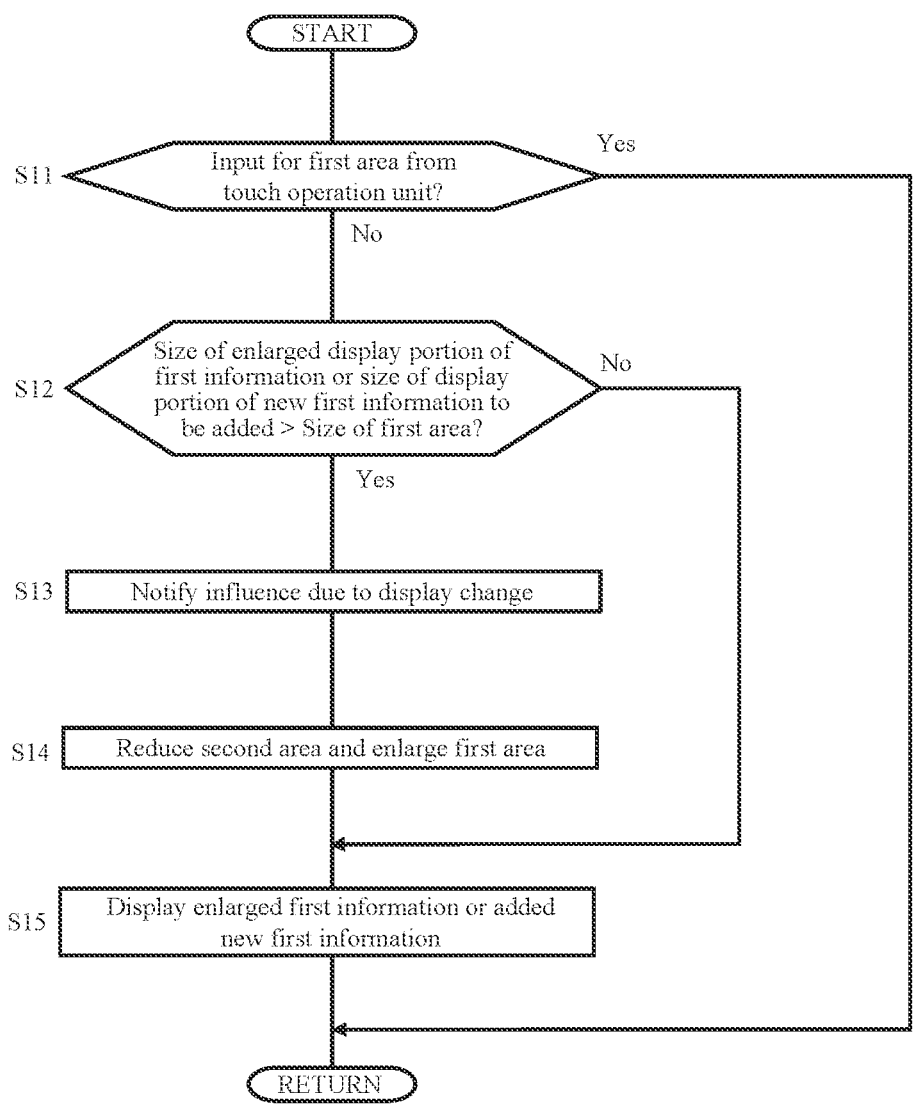
FIG. 8A is a flowchart illustrating an example of an information processing procedure in the display device for vehicles of FIG. 1.
Figure 8B:
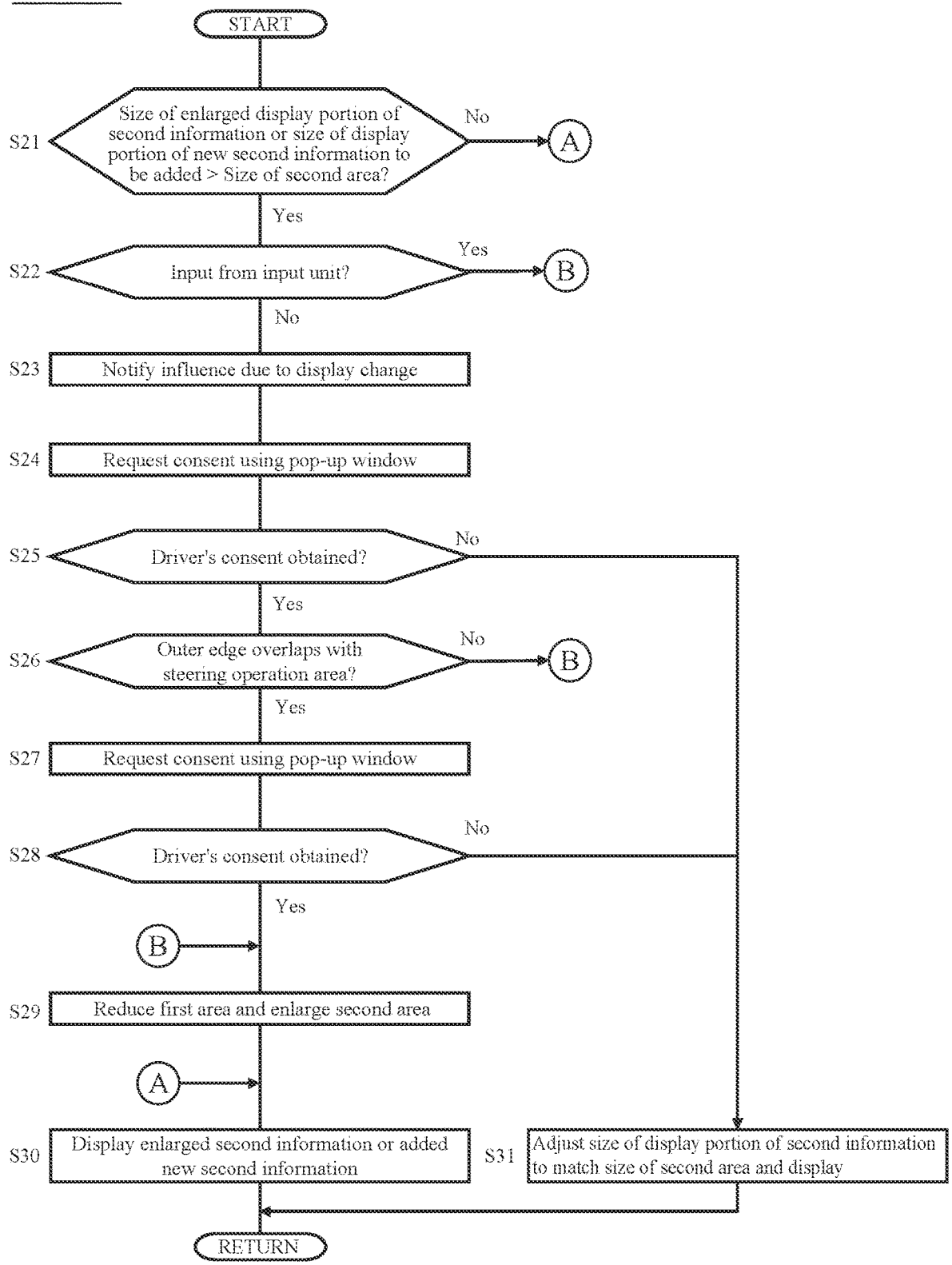
FIG. 8B is a flowchart illustrating another example of the information processing procedure in the display device for vehicles of FIG. 1.

A procedure when the control device 14 processes information will be described with reference to FIGS. 8A and 8B. FIG. 8A is an example of a flowchart illustrating the information processing in the display device for vehicles 1 of the present embodiment when the display portion of the first information displayed in the first area A1 is enlarged or when new first information is added to the first area A1. The processing described below is executed by the processor 15 of the control device 14 at predetermined time intervals.

First, in step S11, the determination unit 22 uses its function to determine whether or not an instruction to enlarge the display portion of the first information displayed in the first area A1 or an instruction to add new first information to the first area A1 is input by the user from the touch operation unit 12. When determining that the instruction is input from the touch operation unit 12, the control unit 21 does not accept the input instruction, stops execution of the routine, and concludes the information processing in the control device 14. On the other hand, when determining that the instruction is not input from the touch operation unit 12, the process proceeds to step S12.

In step S12, the determination unit 22 uses its function to determine whether or not the size of the enlarged display portion of the first information or the size of the display portion of the new first information to be added is larger than the first area A1. When the size of the enlarged display portion of the first information and the size of the display portion of the new first information to be added are equal to or smaller than the size of the first area A1, the process proceeds to step S15, which will be described later. On the other hand, when at least one of the size of the enlarged display portion of the first information or the size of the display portion of the new first information to be added is larger than the size of the first area A1, the process proceeds to step S13.

In step S13, the control unit 21 uses its function to notify users, including the driver, of the influence on the users due to the display change when the enlargement or addition instruction input by a user is executed. The notification is performed, for example, by displaying the influence on the users on the display unit 11. In subsequent step S14, the control unit 21 uses its function to reduce the second area A2 and enlarge the first area A1. In subsequent step S15, the control unit 21 uses its function to display at least one of the first information whose display portion is enlarged or the new first information in the first area A1 of the display unit 11. After that, execution of the routine is stopped, and the processing of information in the control device 14 is concluded.

Next. FIG. 8B is an example of a flowchart illustrating the information processing in the display device for vehicles 1 of the present embodiment when the display portion of the second information displayed in the second area A2 is enlarged or when new second information is added to the second area A2. The processing described below is executed by the processor 15 of the control device 14 at predetermined time intervals.

First, in step S21, the determination unit 22 uses its function to determine whether or not the size of the enlarged display portion of the second information or the size of the display portion of the new second information to be added is larger than the second area A2. When determining that the size of the enlarged display portion of the second information and the size of the display portion of the new second information to be added are smaller than the second area A2, the process proceeds to step S30, which will be described later. On the other hand, when at least one of the size of the enlarged display portion of the second information or the size of the display portion of the new second information to be added is larger than the second area A2, the process proceeds to step S22.

In step S22, the determination unit 22 uses its function to determine whether or not the instruction input by the user is input from the input unit 13 provided on the steering wheel or the like. When determining that the user's input instruction is input from the input unit 13, the control unit 21 does not request consent, and the process proceeds to step S30, which will be described later. On the other hand, when a determination is made that the user's input instruction is not input from the input unit 13, the process proceeds to step S23.

In step S23, as in step S13, the control unit 21 uses its function to notify users, including the driver, of the influence on the users due to the display change when the enlargement or addition instruction input by a user is executed. In subsequent step S24, the first control unit 21a uses its function to display a pop-up window on the driver seat side of the display unit 11 and request the driver's consent to reduce the first area A1 and enlarge the second area A2. In subsequent step S25, a determination is made whether or not the consent is obtained. When a determination is made that the consent is not obtained, the process proceeds to step S31, which will be described later. On the other hand, when a determination is made that the consent is obtained, the process proceeds to step S26.

In step S26, the determination unit 22 uses its function to determine whether or not the outer edge of the changed display portion overlaps with the steering wheel or a driver's hand when viewed from the driver upon execution of the instruction input by the user. Specifically, a determination is made whether or not the steering wheel operation area X is present between the position of the display portion of information in the display unit 11 and a position of the driver's viewpoint (e.g., the position of an eye) that is preliminarily set. When a determination is made that the outer edge of the changed display portion does not overlap with the steering wheel operation area X and does not overlap with the steering wheel or a driver's hand as viewed from the driver, the process proceeds to step S29, which will be described later. On the other hand, when a determination is made that the outer edge of the changed display portion overlaps with the steering wheel operation area X, the process proceeds to step S27.

In step S27, the first control unit 21a uses its function to display a pop-up window on the driver seat side of the display unit 11 and request consent that the outer edge of the display portion is moved to a position at which it overlaps with the steering wheel or a driver's hand when viewed from the driver. In subsequent step S28, a determination is made whether or not the consent is obtained. When a determination is made that the consent is not obtained, the process proceeds to step S31, which will be described later. On the other hand, when a determination is made that the consent is obtained, the process proceeds to step S29.

When the process proceeds to step S29, the control unit 21 uses its function to reduce the first area A1 and enlarge the second area A2. Then, in subsequent step S30, the control unit 21 uses its function to display at least one of the second information whose display portion is enlarged or the new second information in the second area A1 of the display unit 11. After that, execution of the routine is stopped, and the processing of information in the control device 14 is concluded. On the other hand, when the process proceeds to step S31, the control unit 21 uses its function to maintain the size of the second area A2 and adjust the size of the display portion of the second information to match the size of the second area A2. Then, the second information whose display portion is enlarged to match the size of the second area A2 or new second information whose size of the display portion is adjusted to the size of the second area A2 is displayed. After that, execution of the routine is stopped, and the processing of information in the control device 14 is concluded.

Embodiments of the Present Invention

As described above, according to the present embodiment, a display device for vehicles is provided, comprising: a display unit 11 installed in front of a driver seat of a vehicle and having a first area A1 and a second area A2, the first area A1 displaying first information used for travel control of the vehicle, the second area A2 being provided at a position farther from the driver seat than the first area and displaying second information other than the first information: a control unit 21 performing, in response to a user's operation, at least one of enlarging a display portion of information displayed on the display unit 11 or adding new information to the display unit 11: and a determination unit 22 determining, when the display portion of the first information displayed in the first area A1 is enlarged or when new first information is added to the first area A1, whether or not a size of the enlarged display portion of the first information or a size of the display portion of the new first information to be added is larger than the first area A1, wherein when the determination unit 22 determines that the size of the enlarged display portion of the first information or the size of the display portion of the new first information to be added is larger than the first area A1, the control unit 21 reduces the second area A2, enlarges the first area A1, and displays the first information whose display portion is enlarged or the new first information in the enlarged first area A1. This allows the information necessary for travel control to be displayed to the driver in a sufficient size even when the display on the display unit is changed.

According to the display device for vehicles of the present embodiment, when the display portion of the second information displayed in the second area A2 is enlarged or when new second information is added to the second area A2, the determination unit 22 determines whether or not a size of the enlarged display portion of the second information or a size of the display portion of the new second information to be added is larger than the second area A2, and when the determination unit 22 determines that the size of the enlarged display portion of the second information or the size of the display portion of the new second information to be added is larger than the second area A2, the control unit 21 maintains the size of the second area A2 and adjusts the size of the display portion of the second information to match the size of the second area A2. Through this operation, the first information can be displayed to the driver in a sufficient size, and the display in the first area A1 can be prevented from being changed against the driver's intention.

According to the display device for vehicles of the present embodiment, the display unit 11 is provided with a touch operation unit 12 that allows the user to operate the display device for vehicles 1 by finger touch, and the touch operation unit 12 accepts an input to change the display of the second information, but does not accept an input to change the display of the first information. This prevents the driver from operating the display unit 11 by touching the portion that overlaps with the steering wheel operation area X and from losing concentration on the operation of the steering wheel. Moreover, by disabling users other than the driver from instructing changes to the display in the first area A1, it is possible to prevent the display of information used for travel control from being changed against the driver's intention, so that the driver can concentrate on the driving.

According to the display device for vehicles of the present embodiment, when the user's operation is input, the control unit 21 reduces the first area A1 or enlarges the second area A2 in response to the operation. This allows the size of the first area A1 to be changed in response to the user's request.

According to the display device for vehicles of the present embodiment, the control unit 21 reduces the first area A1 after obtaining consent from a driver of the vehicle. This can prevent the display of information relating to the driving, such as images and videos displayed on the display, from being changed against the driver's intention.

According to the display device for vehicles of the present embodiment, when the first area A1 is reduced or the second area A2 is enlarged, the determination unit 22 determines whether or not an outer edge of the display portion of the second information overlaps with a steering wheel or a hand of a driver of the vehicle when viewed from the driver, and when the determination unit 22 determines that the outer edge overlaps with the steering wheel or the hand of the driver, the control unit 21 requests consent from the driver to reduce the first area A1 or enlarge the second area A2. This prevents the driver from operating the display unit 11 by touching the portion that overlaps with the steering wheel operation area X and from losing concentration on the operation of the steering wheel. Moreover, by disabling users other than the driver from instructing changes to the display in the first area A1, it is possible to prevent the display of information used for travel control from being changed against the driver's intention, so that the driver can concentrate on the driving.

According to the display device for vehicles of the present embodiment, the control unit 21 requests the consent from the driver using a pop-up window displayed on the display unit 11. This allows the consent to be reliably requested from the driver.

According to the display device for vehicles of the present embodiment, the pop-up window is displayed on the driver seat side of the display unit 11. This allows the driver to input a response to the consent request from the touch operation unit 12.

According to the display device for vehicles of the present embodiment, the control unit 21 is provided with a first control unit 21a that controls display in the first area A1 and a second control unit 21b that controls display in the second area A2, and display of the pop-up window is performed by the first control unit 21a. This allows the pop-up window to be displayed in the first area A1 near the driver seat.

According to the display device for vehicles of the present embodiment, the steering wheel is provided with an input unit 13 that inputs an operation to the display unit 11, and when the operation is input from the input unit 13 to change the display on the display unit 11, the control unit 21 does not request consent to change the display on the display unit. This allows only the driver to perform input to the input unit 13, and it is therefore possible to omit the unnecessary process of requesting consent from the driver for the operation which is input by the driver.

According to the display device for vehicles of the present embodiment, the display unit 11 includes a first display unit 11a and a second display unit 11b that is different from the first display unit 11a and is installed further away from the driver seat than the first display unit 11a in a vehicle width direction, and the second information is displayed on the second display unit 11b. This allows the display of the first information and second information to be reliably distinguished.

According to the display device for vehicles of the present embodiment, a length of the display unit 11 in a vehicle width direction is 30% to 50% of a total width of the vehicle. This allows the size of the display unit 11 to be increased without impairing the operability of the touch operation unit 12 by the user.

According to the present embodiment, a display method for vehicles is provided, comprising using a display unit 11 and a processor 15 to perform display, the display unit 11 being installed in front of a driver seat of a vehicle and having a first area A1 and a second area A2, the first area A1 displaying first information used for travel control of the vehicle, the second area A2 being provided at a position farther from the driver seat than the first area A1 and displaying second information other than the first information, wherein upon performing, in response to a user's operation, at least one of enlarging a display portion of information displayed on the display unit 11 or adding new information to the display unit 11, the processor 15 operates to: when enlarging the display portion of the first information displayed in the first area A1 or when adding new first information to the first area A1, determine whether or not a size of the enlarged display portion or a size of the display portion of the new first information to be added is larger than the first area A1: and when determining that the size of the enlarged display portion or the size of the display portion of the new first information to be added is larger than the first area A1, reduce the second area A2, enlarge the first area A1, and display the first information whose display portion is enlarged or the new first information in the enlarged first area A1. This allows the information necessary for travel control to be displayed to the driver in a sufficient size even when the display on the display unit is changed.

DESCRIPTION OF REFERENCE NUMERALS

1 . . . Display device for vehicles
11 . . . Display unit
  11a . . . First display unit
  11b . . . Second display unit
12 . . . Touch operation unit
13, 13a, 13b . . . Input unit
14 . . . Control device
15 . . . Processor
  151 . . . CPU
  152 . . . ROM
  153 . . . RAM 2 . . . Processing unit
21 . . . Control unit
21a . . . First control unit
21b . . . Second control unit
22 . . . Determination unit
A1 . . . First area
A2 . . . Second area
B, Ba, Bb . . . Boundary
D11, D11a, D12, D13, D14 . . . Display portion (first information)
D21, D21a, D21b, D22, D23, D24, D25, D26, D27 . . . Display Portion (second information)
D2a, D2b, D2c . . . Display portion (second information)
IP . . . Instrument panel
PW1 to PW4 . . . Pop-up window
SF1 to SF5 . . . Display surface
SW1 to SW15 . . . Switch
X . . . Steering wheel operation area

The invention claimed is:

1. A display device for vehicles, comprising:
a display unit installed in front of a driver seat of a vehicle and having a first area and a second area, the first area displaying first information used for travel control of the vehicle, the second area being provided at a position farther from the driver seat than the first area and displaying second information other than the first information;
a control unit performing, in response to a user's operation, at least one of enlarging a display portion of information displayed on the display unit or adding new information to the display unit; and
a determination unit determining, when the display portion of the first information displayed in the first area is enlarged or when new first information is added to the first area, whether or not a size of the enlarged display portion of the first information or a size of the display portion of the new first information to be added is larger than the first area,
wherein when the determination unit determines that the size of the enlarged display portion of the first information or the size of the display portion of the new first information to be added is larger than the first area, the control unit reduces the second area, enlarges the first area, and displays the first information whose display portion is enlarged or the new first information in the enlarged first area,
wherein when the display portion of the second information displayed in the second area is enlarged or when new second information is added to the second area, the determination unit determines whether or not a size of the enlarged display portion of the second information or a size of the display portion of the new second information to be added is larger than the second area, and
when the determination unit determines that the size of the enlarged display portion of the second information or the size of the display portion of the new second information to be added is larger than the second area, the control unit maintains the size of the second area and adjusts the size of the enlarged display portion of the second information or the size of the display portion of the new second information to be added to match the size of the second area.

2. The display device for vehicles according to claim 1, wherein the display unit is provided with a touch operation unit that allows the user to operate the display device for vehicles by finger touch, and the touch operation unit accepts an input to change the display of the second information, but does not accept an input to change the display of the first information.

3. The display device for vehicles according to claim 1, wherein when the user's operation is input, the control unit reduces the first area or enlarges the second area in response to the operation.

4. The display device for vehicles according to claim 3, wherein
when the first area is reduced or the second area is enlarged, the determination unit determines whether or not an outer edge of the display portion of the second information overlaps with a steering wheel or a hand of a driver of the vehicle when viewed from the driver, and
when the determination unit determines that the outer edge overlaps with the steering wheel or the hand of the driver, the control unit requests consent from the driver to reduce the first area or enlarge the second area.

5. The display device for vehicles according to claim 4, wherein the control unit requests the consent from the driver using a pop-up window displayed on the display unit.

6. The display device for vehicles according to claim 5, wherein the pop-up window is displayed on the driver seat side of the display unit.

7. The display device for vehicles according to claim 5, wherein the control unit is provided with a first control unit that controls display in the first area and a second control unit that controls display in the second area, and
wherein display of the pop-up window is performed by the first control unit.

8. The display device for vehicles according to claim 1, comprising:
an input unit provided on a steering wheel and inputting an operation to the display unit,
wherein when the operation is input from the input unit to change the display on the display unit, the control unit does not request consent to change the display on the display unit.

9. The display device for vehicles according to claim 1, wherein the display unit includes a first display unit and a second display unit that is different from the first display unit and is installed further away from the driver seat than the first display unit in a vehicle width direction, and
wherein the second information is displayed on the second display unit.

10. The display device for vehicles according to claim 1, wherein a length of the display unit in a vehicle width direction is 30% to 50% of a total width of the vehicle.

11. A display method for vehicles, comprising using a display unit and a processor to perform display, the display unit being installed in front of a driver seat of a vehicle and having a first area and a second area, the first area displaying first information used for travel control of the vehicle, the second area being provided at a position farther from the driver seat than the first area and displaying second information other than the first information,
wherein upon performing, in response to a user's operation, at least one of enlarging a display portion of information displayed on the display unit or adding new information to the display unit, the processor operates to:
when enlarging the display portion of the first information displayed in the first area or when adding new first information to the first area, determine whether or not a size of the enlarged display portion or a size of the display portion of the new first information to be added is larger than the first area;

when determining that the size of the enlarged display portion or the size of the display portion of the new first information to be added is larger than the first area, reduce the second area, enlarge the first area, and display the first information whose display portion is enlarged or the new first information in the enlarged first area;

when enlarging the display portion of the second information displayed in the second area or when adding new second information to the second area, determine whether or not a size of the enlarged display portion of the second information or a size of the display portion of the new second information to be added is larger than the second area; and when determining that the size of the enlarged display portion of the second information or the size of the display portion of the new second information to be added is larger than the second area, maintain the size of the second area and adjust the size of the enlarged display portion of the second information or the size of the display portion of the new second information to be added to match the size of the second area.

* * * * *